United States Patent [19]

Noll et al.

[11] Patent Number: 5,265,112
[45] Date of Patent: Nov. 23, 1993

[54] OPTICAL COMB GENERATOR

[75] Inventors: Bernd Noll, Munich; Franz Auracher, Baierbrunn; Alfred Ebberg, Munich, all of Fed. Rep. of Germany

[73] Assignee: Siemens Aktiengesellschaft, Munich

[21] Appl. No.: 919,960

[22] Filed: Jul. 27, 1992

[30] Foreign Application Priority Data

Sep. 27, 1991 [DE] Fed. Rep. of Germany ....... 4132300
Sep. 27, 1991 [DE] Fed. Rep. of Germany ....... 4132301
Sep. 27, 1991 [DE] Fed. Rep. of Germany ....... 4132302

[51] Int. Cl.⁵ ............................................... H01S 3/13
[52] U.S. Cl. ......................................... 372/32; 385/24
[58] Field of Search .................... 372/32, 28, 6, 19; 385/24

[56] References Cited

U.S. PATENT DOCUMENTS

| | | | |
|---|---|---|---|
| 4,702,550 | 10/1987 | Sano | 385/24 |
| 4,890,893 | 1/1990 | Smoot | 385/24 |
| 5,111,322 | 5/1992 | Bergano et al. | 385/24 |
| 5,153,933 | 10/1992 | Smith et al. | 385/32 |

FOREIGN PATENT DOCUMENTS 0385697 9/1990 European Pat. Off.

OTHER PUBLICATIONS

Coppin et al, "Novel Optical Frequency Comb Synthesis Using Optical Feedback", *Electronics Letters*, vol. 26, No. 1, Jan. 4, 1990, pp. 28–30.
Coppin et al, "Wavelength Switching and Processing Using an All-Optical Frequency Synthesiser", *EFOC/LAN 90*, Jun. 27–29, 1990, pp. 314–319.
Arai et al, "New Sensitivity-Enhancing Scheme for a Fiber-Optic Interferometer Utilising Two Optical Loops", *Electronics Letters*, Aug. 4, 1988, vol. 24, No. 16, pp. 1000–1001.

*Primary Examiner*—Rodney B. Bovernick
*Assistant Examiner*—Robert E. Wise
*Attorney, Agent, or Firm*—Hill, Steadman & Simpson

[57] ABSTRACT

For reducing power fluctuations of spectral lines of a comb generator having an annularly closed waveguide, a coupler for coupling light from a separate light source into the waveguide and out of the waveguide and also a sideband modulator, the light circulating in the waveguide can be either separately modulated or the sideband modulator can be operated to have only sidebands of the same operational sign of a frequency shift or with an amount being selected according to a particular arrangement, or can have both positive and negative frequency shifts with the amount being selected by a different formula or the length of the annularly closed waveguide can be dimensioned so that the size of the round-trip time of the light circulating in the waveguide is longer than the defined coherent time of the reference laser light. It is also possible to incorporate various combinations of these alternative ways of reducing the power fluctation.

22 Claims, 4 Drawing Sheets

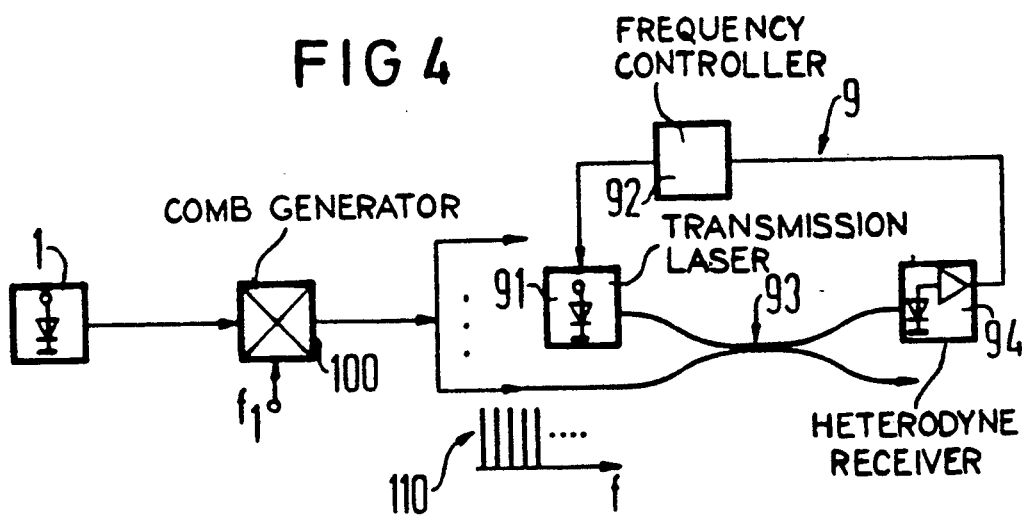

OPTICAL COMB GENERATOR

BACKGROUND OF THE INVENTION

The present invention is directed to an optical comb generator for generating a comb spectrum of spectral lines lying at equidistant optical frequencies from a spectral line generated by a coherent reference light source having a defined coherent time and lying at a defined optical reference frequency, said generator including an annularly closed optical waveguide, means for coupling the optical reference frequency output from a reference light source into the waveguide for circulating in the waveguide with a defined round-trip time and for coupling light from said waveguide, and a single-sideband modulator means arranged in the waveguide to offset the light circulating in the waveguide by a defined, optical frequency shift at every round-trip therein.

For stabilizing the transmission laser of a coherent optical multi-channel transmission system, an optical comb generator is required that produces a set of equidistant reference frequencies from the light of a reference laser so that the respective transmission laser can be bound to a respective reference frequency.

One possible realization of such a comb generator is described in an article in *Electronics Letters*, Vol. 26, No. 1, Jan. 4, 1990, pp. 28–30. In this comb generator, the light of the reference laser is supplied via a fiber coupler into an annularly closed light waveguide. A single-sideband modulator will offset the frequency of the light by a defined frequency shift. One part of the light is coupled out of the waveguide through an optical coupler and the remainder of the light traverses the ring again and is, again, frequency-offset, etc. When the round-trip losses are compensated by an optical amplifier, then the width of the comb spectrum that can be achieved is only dependent on the frequency response of the single-sideband modulator, of the optical amplifier and of the fiber coupler. The optical isolator only prevents the propagation of the light in the waveguide in an undesired round-trip direction.

Single-sideband modulators having a high harmonic distortion attenuation of, for example, more than 30 dB have heretofore only existed only as acousto-optical modulators, for example in the form of Bragg cells wherein, however, the maximum operating frequency amounts to only a few GHz. Over and above this, the conversion efficiency, which is defined by the relationship between the amplitude of the signal frequency-shifted by the specific frequency shift and the amplitude of the light preceding the single-sideband modulator, decreases given high frequencies and only amounts to a few percent for frequencies of more than 1 GHz.

Electro-optical single-sideband modulators effortlessly reach operating frequencies of more than 10 GHz. However, a harmonic distortion attenuation of more than 30 dB given a simultaneously high conversion of efficiency of more than 0.9 can only be achieved for extremely small fabrication spreads.

When the single-sideband modulator generates a plurality of modulation sidebands, then a superposition of the sub-waves of the same frequency from different round-trip cycles occurs in the annularly closed waveguide. Dependent on the excitation of the undesired modulation sidebands, the phase shift between the individual sub-waves, the modulation frequency of the single-sideband modulator that defines the frequency shift, as well as the round-trip time required for a round-trip in the waveguide, the power in the individual spectral lines differs greatly, individual spectral lines can disappear or the annularly closed waveguide can even resonate.

The problem can be overcome if the reference laser is pulsed (see, for example, *EFOC/LAN Conference Volume*, 1990, pp. 314–319). Here, the pulse duration should be selected no greater than the round-trip time, and the pulse spacing should be selected of such a size that no interference from light of the neighboring pulses occurs in the ring. The average power in each spectral line is reduced, however, according to the pulse-duty factor so that the signal-to-noise ratio required for reliable frequency control can no longer be achieved under certain circumstances.

SUMMARY OF THE INVENTION

The object of the present invention is to disclose several other ways in which a power fluctuation of the spectral lines can be reduced in an optical comb generator for generating the comb spectrum of spectral lines lying at equidistant optical frequencies from a spectral line generated by a coherent reference light source having a defined coherent time.

To accomplish these goals, the present invention is directed to several improvements in an optical comb generator for generating a comb spectrum of spectral lines lying at equidistant optical frequencies from a spectral line generated by coherent reference light source having a defined coherent time and lying at a defined optical reference frequency, which generator comprises an annularly closed optical waveguide, means for coupling light having an optical reference frequency ($f_0$) from a reference light source and for uncoupling a part of the light which had been coupled into the waveguide and circulating in the waveguide with a defined round-trip time ($\tau$), and a single-sideband modulator means being arranged in the waveguide to offset the light circulating in the waveguide by a defined optical frequency shift on every round-trip.

The improvements in accordance with the present invention are, either together or by themselves, including providing means for modulating the light circulating in the waveguide, dimensioning the length of the annularly closed waveguide to such a size that the round-trip time ($\tau$) of the light circulating in the waveguide is longer than the defined coherent time ($\tau_k$) of the coherent light source or that the single-sideband modulator means either generates sidebands having single operational signs of a frequency shift in that $|f_1|$ of the frequency shift $f_1$ is selected with the product of $|f_1| \cdot \tau$ of this amount $|f_1|$ and the round-trip time $\tau$ of the light in the waveguide is equal to $\pi/2 + k\pi$, wherein k denotes an arbitrary selectable integer number of the single-sideband modulator generates sidebands having a positive and negative frequency shift of $+f_1$ and $-f_1$ and that the amount $|f_1|$ of the frequency shift $+f_1$, $-f_1$ is selected so that the product $|f_1| \cdot \tau$ of the amount $|f_1|$ and the round-trip time $\tau$ of the light waveguide is equal to $\pi/4 + k\pi$, wherein k is an arbitrary selectable integer number.

As a result of the invention, the comb generator having one or more of these improvements can be advantageously continuously operated with a non-ideal single-sideband modulator without having the power fluctuations of the spectral lines of the comb spectrum exceeding a defined degree.

The comb spectrum sensitively reacts to modifications in the phase of the light in a round-trip in the waveguide. This phase should, therefore, be kept optimally constant. The sensitivity of the comb spectrum to modifications in the phase of the light in a round-trip in the waveguide is defined by the product of the frequency shift and the round-trip time of the light in the waveguide. When this product is selected equal to $k \cdot \pi$, wherein k is an arbitrarily-selectable, whole number, modifications in the phase of light cause greater amplitude fluctuations of a spectral line in a round-trip in the waveguide that are all the more pronounced the farther the frequency of the spectral line lies from the reference frequency. As a result of the inventive, separate modulation, the optical length of the annularly closed waveguide can, advantageously be so quickly modulated that the amplitude fluctuations are no longer perceived by the control circuit.

When the improvement includes means for separately modulating, this preferably includes phase modulator means with which the phase of the circulating light can be separately phase modulated being arranged in the waveguide. The separate modulation can be achieved with the assistance of a phase modulator that is preferably sinusoidally driven. The frequency of this phase modulation should be greater than the band width of the frequency control, but noticeably smaller than the line width of the spectral lines generated by the coherent reference light source. The phase swing of the additional frequency modulation should lie on the order of magnitude of $\pi/2$.

The same effect is achieved when the means are provided for frequency modulating the coherent reference light source and it is weakly frequency modulated so that the conditions are analogous to those in the separate phase modulation applied for the frequency and strength of this separate frequency modulation.

Other advantages and features of the invention will be readily apparent from the following description of the preferred embodiments, the drawings and claims.

BRIEF DESCRIPTION OF THE DRAWINGS

FIG. 4 is an example of a comb generator in a coherent optical multi-channel transmission system.

DESCRIPTION OF THE PREFERRED EMBODIMENTS

Figure 1:
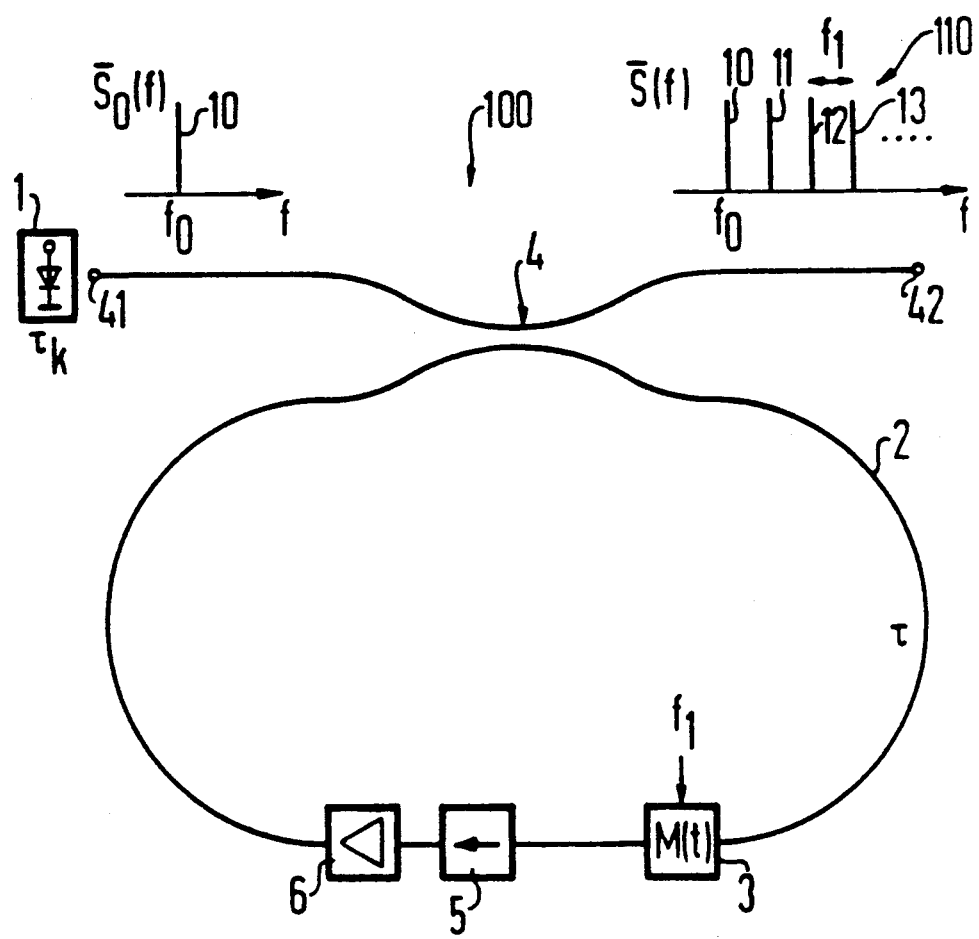
FIG. 1 is an exemplary embodiment of a comb generator according to the present invention.

The principles of the present invention are particularly useful when incorporated in a comb generator, which is generally indicated at 100 in FIG. 1. A coherent optical reference light source 1 in the form of a reference laser having a coherent time $\tau_k$ generates a coherent light whose frequency spectrum entered over a frequency f exhibits a single spectral line 10 at an optical reference frequency $f_0$. The mean power of this spectral line 10 is reference $s_0(f)$.

The light of the spectral line 10 is coupled into an optical 3bB fiber directional coupler 4 through an input gate or port 41 of the coupler. This light, which is in the coupler, will then enter an annularly closed, optical fiber waveguide 2 in which the infed light circulates in a clockwise direction with a round-trip time $\tau$. A part of the circulating light is coupled out from the annularly closed waveguide 2 through the coupler 4 at an output gate or port 42 of this coupler, while the rest of the light will continue to circulate in the waveguide 2.

A single-sideband modulator means is formed by a modulator 3 that frequency-shifts the light circulating in the waveguide by the optical frequency shift $f_1$. As illustrated, this modulator 3 is arranged in the waveguide 2. This frequency shift $f_1$ occurs at every round-trip cycle defined by the round-trip time $\tau$. The light having the reference frequency $f_0$ coupled into the waveguide 2 is frequency-shifted by the frequency shift $f_1$ in the single-sideband modulator 3, so that the light emerging from the single-sideband modulator 3 and continuing to circulate in the waveguide 2 has a frequency of $f_0+f_1$. When this light having the frequency $f_0+f_1$ that is circulating the waveguide 2 again encounters the single-sideband modulator 3, this modulator again frequency-shifted by $f_1$ in the modulator so that the light emerging from the modulator will then have a frequency of $f_0+2f_1$. After n round-trips, the circulating light has a frequency $f_0+nf_1$, whereby n denotes an arbitrary natural number. The result is that the light having a comb spectrum 110 emerges at the output gate or port 42 with spectral lines 10, 11, 12, 13, ... successively having the frequencies $f_0$, $f_0+f_1$, $f_0+2f_1$, $f_0+3f_1$, ... The mean power of each of these spectral lines 10, 11, 12, 13, ... is referenced $\bar{s}(f)$.

In addition to the single-sideband modulator 3, an optical isolator 5 and an optical amplifier 6 are arranged in the waveguide 2. Their meaning and purpose have already been set forth hereinabove.

The length of the annularly closed waveguide 2 is selected of such a size that the round-trip time $\tau$ of the light circulating in the waveguide 2 is longer than the defined coherent time $\tau_k$ of the coherent reference light source 1.

Apart from this, the single-sideband modulator 3 can be fashioned so that it generates only sidebands having the same operational sign of the frequency shift $f_1$ and such that the amount $|f_1|$ of the frequency shift $f_1$ is selected so that $|f_1| \cdot \tau = \pi/2 + k\pi$, wherein k denotes an arbitrary selectable integer number.

The single-sideband modulator can also be fashioned so that it generates sidebands having positive and negative frequency shifts $+f_1$ and $-f_1$ and such that the amount $|f_1|$ of the frequency shift $+f_1$, $-f_1$ is selected so that $|f_1| \cdot \tau = \pi/4 + k\pi$, wherein k denotes an arbitrary selectable integer number.

Figure 2:
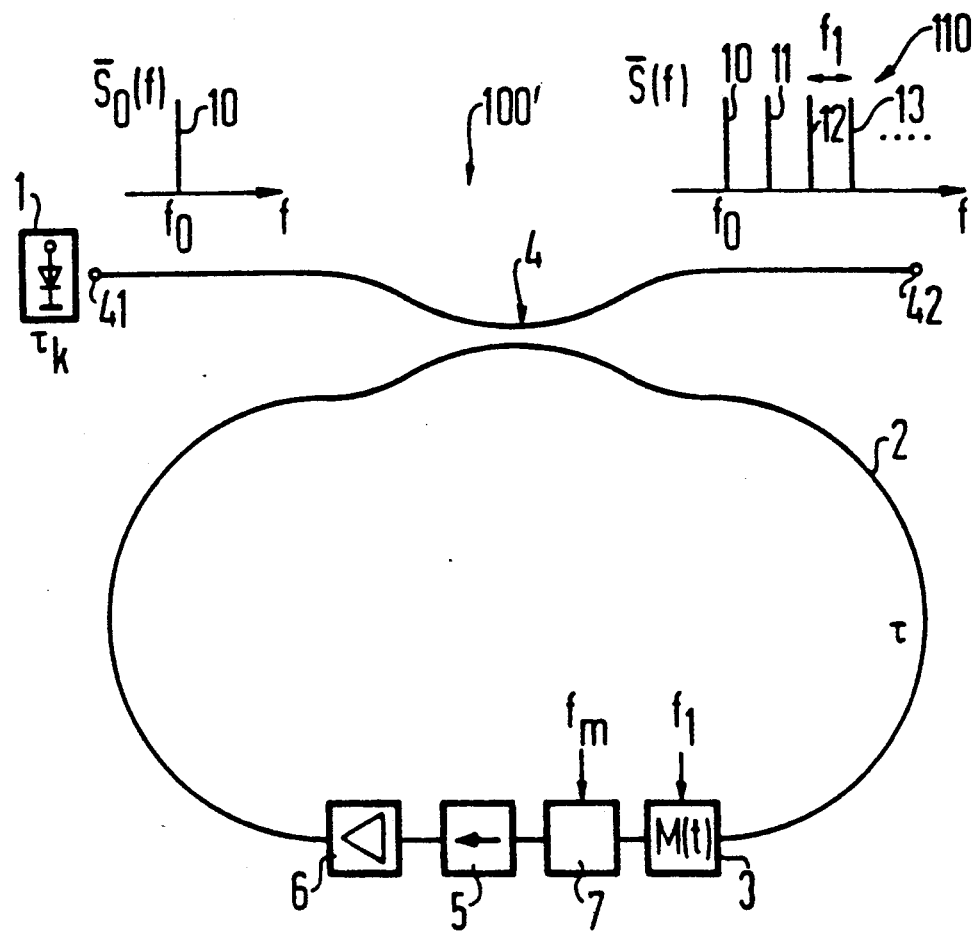
FIG. 2 is an exemplary embodiment of a comb generator with a phase modulator arranged in the waveguide in accordance with the present invention.

A modification of the comb generator 100 of FIG. 1 is generally indicated at 100' in FIG. 2. The generator 100' differs from the generator 100 in that it includes a phase modulator 7 with which the frequency of the light circulating in the waveguide 2 can be separately phase-modulated. This modulator 7 is arranged in the annularly closed waveguide 2. The phase modulator 7 is preferably sinusoidally driven. The frequency $f_m$ of the separate modulation should be higher than the band width of the frequency control, but noticeably lower than the line width of the spectral line 10 of the reference light source 1. The phase swing should lie in the order of magnitude of $\pm \pi/2$.

Figure 3:
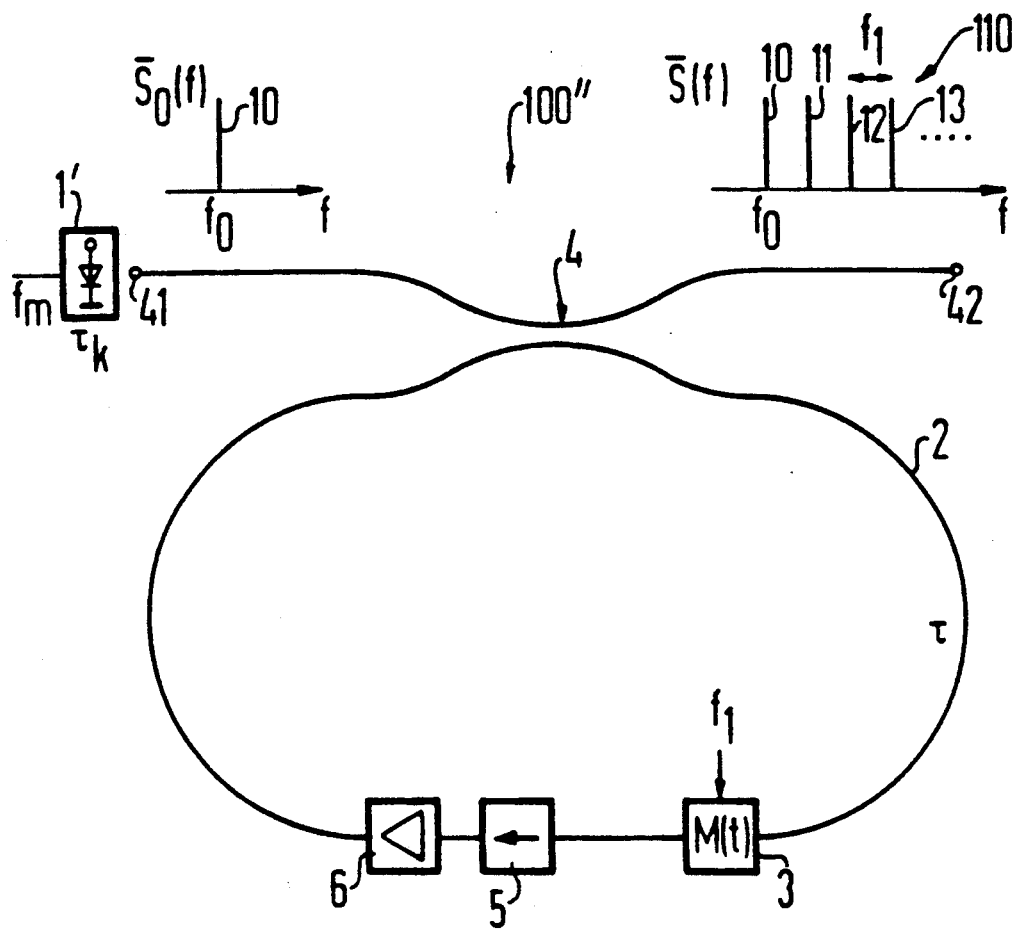
FIG. 3 is a modification of the comb generator according to FIG. 1, wherein the reference light source can be frequency modulated.

The same effect achieved with the comb generator 100' of FIG. 2 can be achieved by the modification of the comb generator, generally indicated at 100'' in FIG. 3. The comb generator 100'' of FIG. 3 differs from the comb generator 100 according to FIG. 2 in that the coherent reference light source 1' can be frequency-modulated with the frequency $f_m$ of the separate modulation as a result whereof the phase modulator 7 in the embodiment of FIG. 2 is eliminated. The light source 1' should be weakly frequency-modulated whereby conditions analogous to those of the phase modulation with the phase modulator 7 in the embodiment of FIG. 2 are valid for frequency and strength of the frequency modulation.

In the applied example of the inventive comb generator 100 shown in FIG. 4 for a coherently optical multi-channel transmission system 9, a respective spectral line of the comb spectrum 110 generated by the comb generator 100 of the invention is allocated to a respective heterodyne receiver 94. The light of this spectral line excites a transmission laser 91 allocated only to the heterodyne receiver. The light of this transmission laser 91 and the light of the spectral lines are superimposed in an optical direction coupler 93 and are connected to the heterodyne receiver 94. In this form for processing, the frequency control of the transmission laser 91 via a frequency controller 92 occurs proceeding from the heterodyne receiver 94.

Although various minor modifications may be suggested by those versed in the art, it should be understood that we wish to embody within the scope of the patent granted hereon all such modifications as reasonably and properly come within the scope of our contribution to the art.

We claim:

1. In an optical comb generator for generating a comb spectrum of spectral lines lying at equidistant optical frequencies from a spectral line generated by a coherent reference light source having a defined coherent time ($T_k$) and lying at a defined optical reference frequency ($f_0$), said generator comprising an annularly closed, optical waveguide, means for coupling a light having the optical reference frequency ($f_0$), which is an output from a reference light source into the waveguide, and for outcoupling a part of the light coupled into the waveguide and circulating in the waveguide with a defined round-trip time ($\tau$), and said generator including single-sideband modulator means arranged in the waveguide for offsetting the light circulating in the waveguide by a defined optical frequency shift at every round-trip of the light therein, the improvements comprising means for separately modulating the light circulating in the waveguide.

2. In an optical comb generator according to claim 1, which includes means for frequency-modulating the coherent reference light source.

3. In an optical comb generator according to claim 1, wherein the means for separately modulating includes phase modulator means being arranged in the waveguide for modulating the phase of the light circulating in said waveguide.

4. In an optical comb generator according to claim 3, which includes means for frequency-modulating the coherent reference light source.

5. In an optical comb generator according to claim 1, wherein the length of the annularly closed waveguide is dimensioned so that the size of the round-trip time $\tau$ of the light circulating in the waveguide is longer than the defined coherent time $\tau_k$ of the coherent reference light source.

6. In an optical comb generator according to claim 1, wherein the single-sideband modulator means generates only sidebands having the same optical sign of the frequency shift, in that the amount $|f_1|$ of the frequency shift $f_1$ is selected with the product of $|f_1|\cdot\tau$ of this amount $|f_1|$ and the round trip time $\tau$ of the light in the waveguide is equal to $\pi/2+k\pi$, wherein k denotes an arbitrary selectable integer number.

7. In an optical comb generator according to claim 1, wherein the single-sideband modulator means generates a sideband having positive and negative frequency shifts $+f_1$, $-f_1$ and that the amount $|f_1|$ of the frequency shift $+f_1$, $-f_1$ is selected so that the product $|f_1|\cdot\tau$ of this amount $|f_1|$ and the round-trip time $\tau$ of the light in the waveguide is equal to $\pi/4+k\pi$, wherein k is an arbitrary selectable integer number.

8. In an optical comb generator for generating comb spectrums of spectral lines lying at equidistant optical frequencies from a spectral line generated by a coherent reference light source having a defined coherent time ($\tau_k$) and lying at a defined optical reference frequency ($f_0$), said generator comprising an annularly closed, optical waveguide, means for coupling a light having an optical reference frequency ($f_0$), which is an output from a reference light source into the waveguide, and for outcoupling a part of the light coupled into the waveguide and circulating in the waveguide with a defined round-grip time ($\tau$), and said generating including single-sideband modulator means arranged in the waveguide for offsetting the light circulating in the waveguide by a defined optical frequency shift at every round-trip of the light in said waveguide, the improvements comprising the length of the annularly closed waveguide being dimensioned so that the size of the round-trip time ($\tau$) of the light circulating in the waveguide is longer than the defined coherent time ($\tau_k$) of the coherent reference light source.

9. In an optical comb generator according to claim 8, wherein the single-sideband modulator means generates only sidebands having the same optical sign of the frequency shift, in that the amount $|f_1|$ of the frequency shift $f_1$ is selected with the product of $|f_1|\cdot\tau$ of this amount $|f_1|$ and the round-trip time $\tau$ of the light in the waveguide is equal to $\pi/2+k\pi$, wherein k denotes an arbitrary selectable whole number.

10. In an optical comb generator according to claim 9, which includes means for separately modulating the light circulating in the waveguide.

11. In an optical comb generator according to claim 10, wherein the means for separately modulating is a phase modulator means arranged in the light waveguide for separately modulating the light circulating therein.

12. In an optical comb generator according to claim 10, wherein the means for separately modulating is means for frequency modulating the coherent reference light source.

13. In an optical comb generator according to claim 8, wherein the single-sideband modulator means generates a sideband having positive and negative frequency shifts $+f_1$, $-f_1$ and that the amount $|f_1|$ of the frequency shift $+f_1$, $-f_1$ is selected so that the product $|f_1|\cdot\tau$ of this amount $|f_1|$ and the round-trip time $\tau$ of the light in the waveguide is equal to $\pi/4+k\pi$, wherein k is an arbitrary selectable whole number.

14. In an optical comb generator according to claim 13, which includes means for separately modulating the light circulating in the waveguide.

15. In an optical comb generator according to claim 14, wherein the means for separately modulating is a phase modulator means arranged in the light waveguide for separately modulating the light circulating therein.

16. In an optical comb generator according to claim 14, wherein the means for separately modulating is means for frequency modulating the coherent reference light source.

17. In an optical comb generator for generating a comb spectrum of spectral lines lying at equidistant optical frequencies from a spectral line generated by a coherent reference light source having a defined coherent time ($\tau_k$) and lying at a defined optical reference frequency ($f_0$), said generator comprising an annularly closed, optical waveguide, means for coupling a light having the optical reference frequency ($f_0$), which is an output from a reference light source into the waveguide, and for outcoupling a part of the light coupled into the waveguide and circulating in the waveguide with a defined round-trip time ($\tau$), and said generator including single-sideband modulator means arranged in the waveguide for offsetting the light circulating in the waveguide by a defined optical frequency shift at every round-trip of the light therein, the improvement comprising the single-sideband modulator generates sidebands having the same operational sign of the frequency shift and the amount $|f_1|$ of the frequency shift $f_1$ is selected with the product $|f_1|\cdot\tau$ of the amount $|f_1|$ and the round-trip time $\tau$ of the light in the waveguide being equal to $\pi/2+k\pi$, wherein k denotes an arbitrary selectable whole number.

18. In an optical comb generator according to claim 17, wherein the light source can be frequency modulated.

19. In an optical comb generator according to claim 17, which includes a phase modulator means being arranged in the waveguide for separately phase modulating the light circulating in the waveguide.

20. In an optical comb generator for generating a comb spectrum of spectral lines lying at equidistant optical frequencies from a spectral line generated by a coherent reference light source having a defined coherent time ($\tau_k$) and lying at a defined optical reference frequency ($f_0$), said generator comprising an annularly closed, optical waveguide, means for coupling a light having the optical reference frequency ($f_0$), which is an output from a reference light source into the waveguide, and for outcoupling a part of the light coupled into the waveguide and circulating in the waveguide with a defined round-trip time ($\tau$), and said generator including single-sideband modulator means arranged in the waveguide for offsetting the light circulating in the waveguide by a defined optical frequency shift at every round-trip of the light therein, the improvement comprising the single-sideband modulator means generating sidebands having positive and negative frequency shifts $+f_1$, $-f_1$ and that the amount $|f_1|$ of the frequency shift $+f_1$, $-f_1$ is selected so that the product $|f_1|\cdot\tau$ of this amount $|f_1|$ and the round-trip time $\tau$ of the light in the waveguide is equal to $\pi/4+k\pi$, wherein k is an arbitrary selectable whole number.

21. In an optical comb generator according to claim 20, which includes means for frequency modulating the coherent reference light source.

22. In an optical comb generator according to claim 20, which includes phase modulator means being arranged in the waveguide for modulating the phase of the light circulating in said waveguide.

* * * * *